United States Patent
Montes

[15] 3,670,084
[45] June 13, 1972

[54] METHOD OF TREATING PSORIASIS WITH CYCLOHEXIMIDE

[72] Inventor: Leopoldo F. Montes, 4319 Kennesan Drive, Birmingham, Ala. 35213

[22] Filed: June 20, 1969

[21] Appl. No.: 835,230

[52] U.S. Cl............................................................424/268
[51] Int. Cl......................................A61k 21/00, A61k 27/00
[58] Field of Search...................................................424/268

[56] References Cited

UNITED STATES PATENTS

| | | | |
|---|---|---|---|
| 2,977,282 | 3/1961 | Gray | 424/268 |
| 3,014,840 | 12/1941 | Vellaire | 424/268 |
| 3,086,913 | 4/1963 | Hamilton | 424/268 |

*Primary Examiner*—Sam Rosen
*Attorney*—Jennings, Carter & Thompson

[57] ABSTRACT

Cycloheximide composition for use in treating psoriasis. Cycloheximide dispersed in a pharmaceutically acceptable topical carrier and topically applied to psoriasis affected area of skin.

6 Claims, No Drawings

METHOD OF TREATING PSORIASIS WITH CYCLOHEXIMIDE

BACKGROUND OF INVENTION

This invention relates to pharmaceutical compositions and the method of topically using the same for the treatment of psoriasis and more particularly to the use of such compositions in which the primary active ingredient is cycloheximide. Cycloheximide ($C_{15}H_{23}NO_4$) is an antibiotic substance isolated from the beers of streptomycin producing strains of streptomyces griseus. It is very active against many yeasts and fungi but is tolerated in relatively high concentrations by most bacteria. Heretofore, cycloheximide has not been employed for topical use and users have been warned that cycloheximide is a potent irritant and should be handled with caution to avoid contact with unprotected skin. Such warnings usually include a statement that hands or other skin areas which have come into contact with cycloheximide should be immediately and thoroughly washed with soap and water.

Although great advances have occurred in dermatologic therapy one major skin disease, psoriasis, still lacks satisfactory treatment. The widely used Goeckerman regimen (crude coal tar and ultraviolet light irradiation) requires hospitalization, is not effective with every patient and is not cosmetically acceptable. Another conventional treatment for psoriasis is steroids under occlusion. However, this treatment is expensive and unpractical in generalized psoriasis and has a significant incidence of after treatment relapses.

While some inhibitors of nucleic acid synthesis and protein synthesis (aminopterin, methotrexate) are useful in the systemic treatment of psoriasis, they have little or no effectiveness when topically applied.

SUMMARY OF INVENTION

In accordance with my invention I form a composition consisting of cycloheximide dispersed in a pharmaceutically acceptable topical carrier. The composition is topically applied to a psoriasis affected area of skin.

DETAILED DESCRIPTION OF INVENTION

There are basic abnormalities in psoriatic skin in that the epidermis in psoriatic lesions is characterized by an increase in the amounts of ribonucleic acid, desoxyribonucleic acid and protein, above the levels found in the epidermis of normal skin. Also, the epidermis in lesions of psoriasis shows pronounced hyperplasia, a large number of mitoses and a greatly accelerated turnover time of cell population.

I have found that cycloheximide exerts, with great intensity, a number of biochemical effects which are opposite those increased in psoriasis. Cycloheximide inhibits synthesis of both protein and desoxyribonucleic acid. In some cells the inhibition of protein synthesis occurs by inhibition of the transfer of aminoacid from soluble ribonucleic acid to the ribosomes and their subsequent polymerization into protein. Also, cycloheximide produces a blockage of mitosis at early prophase but not in late prophase or thereafter whereby cells in this stage continue the process of mitosis. Furthermore, the effects of cycloheximide are reversible which is a desirable property when treating a benign condition.

In preparing my composition, the cycloheximide is the primary active ingredient and comprises from about 0.05 percent to 0.2 percent by weight of the composition. Preferably, the cycloheximide comprises approximately 0.1 percent by weight of the composition.

The following examples are illustrative of the method and products of the prevent invention, but are not to be construed as limiting.

EXAMPLE 1

0.1 gram of cycloheximide is mixed with 100 grams of a vehicle in the form of a semisolid oil in water emulsion containing polyhydric alcohol esters, propylene glycol and liquid petrolatum. A suitable such vehicle or base is sold under the trade name "NEOBASE."

EXAMPLE 2

0.1 gram of cycloheximide is mixed with 100 grams of a vehicle containing 40 grams polyethylene glycol 4,000 and 60 grams polyethylene glycol 400.

EXAMPLE 3

0.1 grams of cycloheximide is mixed with 100 grams of a vehicle containing, by weight, 88.16 percent liquid petrolatum, 5.64 percent polyethylene, 6 percent emulsifying agent, 0.1 percent antioxidant, and 0.1 percent preservative. A suitable such vehicle is sold under the trade name "PLASTIBASE HYDROPHILIC."

EXAMPLE 4

0.1 gram of cycloheximide is mixed with 100 grams of a vehicle in the form of a hydrophilic material containing high molecular hydroxyl animal fats. A suitable such vehicle is sold under the trade name "AQUAPHOR."

Preferably the vehicle is in the form of an ointment, paste or cream which does not spread easily beyond the limits of the treated area.

The term "topical" as employed herein relates to the application of the cycloheximide, incorporated in a suitable base or vehicle, at the site of the psoriasis affected area for exertion of local action. Accordingly, such topical compositions include those pharmaceutical forms in which the cycloheximide is applied externally by direct contact with the surface to be treated. By "pharmaceutically acceptable" carrier or base as used herein is meant the vehicle into which the cycloheximide is incorporated, the said vehicle comprising the various pharmaceutically suitable additives for the purpose of facilitating the incorporation of the cycloheximide into the desired pharmaceutical form.

In testing my improved composition for treating psoriasis I first tested for skin tolerance by applying my composition three times daily to the anterior aspect of the right forearm of six normal subjects, three being males and three being females. This testing period lasted for three weeks during which time one subject developed mild erythema (redness) on the 10th day which was temporary. The other subjects showed no reaction to the composition.

After the preliminary testing period, 10 patients, five males and five females, with psoriasis were started on a treatment program wherein my composition set forth in Example I was applied two to three times per day. All subjects were private patients of the inventor. The results of this treatment are summarized in the following table:

SUMMARY OF DATA ON PATIENTS TREATED

| Patient Number | Age | Sex | Duration of Treatment | Daily Applic. |
|---|---|---|---|---|
| 1 | 38 | M | 14 days | 2 |
| 2 | 42 | M | 14 days | 2 |
| 3 | 36 | M | 21 days | 3 |
| 4 | 45 | M | 28 days | 3 |
| 5 | 52 | M | 21 days | 2 |
| 6 | 61 | F | 14 days | 3 |
| 7 | 39 | F | 21 days | 2 |
| 8 | 28 | F | 19 days | 3 |
| 9 | 46 | F | 35 days | 3 |
| 10 | 44 | F | 21 days | 3 |

| Patient Number | Type of Lesion | Area Treated | Degree of Improvement |
|---|---|---|---|
| 1 | Plaque | Knee | 100% |
| 2 | Plaque | Elbow | 75% |
| 3 | Plaque | Knee | 100% |
| 4 | Guttate | Thigh | 100% |
| 5 | Plaque | Knee | 75% |

| 6  | Plaque  | Leg     | 50%  |
| 7  | Plaque  | Elbow   | 25%  |
| 8  | Guttate | Knee    | 100% |
| 9  | Plaque  | Knee    | 100% |
| 10 | Plaque  | Abdomen | 75%  |

From the foregoing it will be seen that I have devised an improved composition and method for the treatment of psoriasis.

It is to be understood that I do not desire to be limited to the precise examples, proportions or embodiment herein disclosed for obvious modifications will occur to a person skilled in the art.

What I claim is:

1. A method of treating psoriasis affected area of skin which comprises topically applying to said affected area a composition of cycloheximide dispersed in a pharmaceutically acceptable topical carrier in which the cycloheximide comprises from about 0.05 to 0.2 percent by weight of the composition.

2. The method of treating psoriasis affected area of skin as defined in claim 1 in which the cycloheximide comprises approximately 0.1 percent by weight of the composition.

3. The method of treating psoriasis affected area of skin as defined in claim 1 in which the carrier is a semisolid.

4. The method of treating psoriasis affected area of skin as defined in claim 1 in which the carrier is a semisolid oil in water emulsion containing polyhydric alcohol esters, propylene glycol and liquid petrolatum.

5. The method of treating psoriasis affected area of skin as defined in claim 1 in which the carrier is polyethylene glycol.

6. The method of treating psoriasis affected area of skin as defined in claim 1 in which the carrier comprises, by weight, approximately 88.16 percent liquid petrolatum, 5.64 percent polyethylene, 6 percent emulsifying agent, 0.1 percent antioxidant and 0.1 preservative.

* * * * *